(12) United States Patent  (10) Patent No.: US 6,994,645 B2
Tange  (45) Date of Patent: *Feb. 7, 2006

(54) ELEMENT CORRECTION METHOD OF CONTINUOUSLY VARIABLE TRANSMISSION BELT

(75) Inventor: Hiroshi Tange, Shizuoka (JP)

(73) Assignee: JATCO Ltd, (JP)

( * ) Notice: Subject to any disclaimer, the term of this patent is extended or adjusted under 35 U.S.C. 154(b) by 149 days.

This patent is subject to a terminal disclaimer.

(21) Appl. No.: 10/448,083

(22) Filed: May 30, 2003

(65) Prior Publication Data

US 2003/0236143 A1  Dec. 25, 2003

(30) Foreign Application Priority Data

Jun. 3, 2002 (JP) .............................. 2002-162156

(51) Int. Cl.
*G01N 19/00* (2006.01)
(52) U.S. Cl. ................................. 474/204; 73/862.391
(58) Field of Classification Search ........... 73/862.391; 474/201, 204, 206
See application file for complete search history.

(56) References Cited

U.S. PATENT DOCUMENTS

| 4,413,513 | A | * | 11/1983 | Ross et al. ..................... 73/162 |
| 5,127,885 | A | * | 7/1992 | Herbert et al. ............... 474/260 |
| 5,798,456 | A | * | 8/1998 | Tranquilla .................... 73/579 |
| 6,626,782 | B1 | | 9/2003 | Ohsono et al. |
| 6,684,473 | B1 | * | 2/2004 | Yamagishi et al. ...... 29/407.01 |
| 6,779,414 | B2 | * | 8/2004 | Shori et al. ................ 73/865.9 |

FOREIGN PATENT DOCUMENTS

| EP | 1 067 311 | 1/2001 |
| JP | 2002 05345 | 7/2000 |
| JP | 2001-021007 | 1/2001 |
| JP | 2001 021007 | 1/2001 |
| JP | 2001-146943 | 5/2001 |
| JP | 2001-232306 | 8/2001 |

OTHER PUBLICATIONS

European Search Report (Nov. 24, 2004).

* cited by examiner

Primary Examiner—Vicky A. Johnson
(74) Attorney, Agent, or Firm—Blank Rome LLP

(57) ABSTRACT

An element correction method of continuously variable transmission belt assembled through supporting an element laminated body constituted of a number of metal elements on a belt laminated body constituted of a plurality of steel belts. The method includes the steps of: a pre-step of removing the belt laminated body from the continuously variable transmission belt, and attaching a dummy belt in place of the removed belt laminated body; a trial step of applying a load on a continuously variable transmission belt to which the dummy belt is attached for trial use; and a post-step of removing the dummy belt from the continuously variable transmission belt after completion of the trial step, and attaching the belt laminated body removed in the pre-step or a belt laminated body of similar structure in place of the removed dummy belt. Thus, abnormal shaped portions of the metal element can be efficiently and assuredly removed.

9 Claims, 8 Drawing Sheets

PRIOR ART

PRIOR ART

ELEMENT CORRECTION METHOD OF CONTINUOUSLY VARIABLE TRANSMISSION BELT

BACKGROUND OF THE INVENTION

The present invention relates to an element correction method of continuously variable transmission belt laid on a driving pulley and a driven pulley of a continuously variable transmission, wherein the diameter ratio of the two pulleys is controlled to continuously change the transmission gear ratio of a vehicle such as an automobile. More specifically, the invention relates to an element correction method of a continuously variable transmission belt which is assembled through the process of laminating a number of metal elements punched into predetermined shapes, and supported by a laminated body thereof on a metal endless belt (hereinafter referred to as "steel belt").

FIGS. 7A and 7B show the appearance of a continuously variable transmission belt. In the drawings, a continuously variable transmission belt 1 is assembled to form an assembly through supporting an element laminated body 3 constituted of a number of (e.g., about 400) metal elements 3a on two runs of belt laminated body 2 consisting of a plurality of (e.g., 12) steel belts 2a.

The metal element 3a is a steel block (small metal piece) formed in a predetermined shape by a metal plate punching process. For example, it is formed in a shape which brings to mind the upper half image of a human body, i.e., a shape which has a "head part 3b", a "breast part 3c" and a "neck part 3d" interconnected by the head part 3b and the breast part 3c.

A projection 3e is formed on one surface (front surface of the drawing) of the head part 3b, and a recess (not shown) is formed on the other surface (backside of the drawing). Projections 3e and recesses of adjacent metal elements 3a are fitted together to align the metal elements 3a with each other.

Two runs of belt laminated body 2 are fitted into recess 3f formed between the head part 3b and the breast part 3c of the metal element 3a. Here, the number of laminations is set for the belt laminated body 2 so that when the space between the head part 3b and the breast part 3c (spacing width of the recess 3f) is "L", the lamination thickness D of the belt laminated body 2 becomes a value approximately equal to or slightly smaller than L.

As shown in FIG. 8, the continuously variable transmission belt 1 which has the aforementioned constitution is laid on a driving pulley 4 (driving side pulley or input side pulley) and a driven pulley 5 (driven side pulley or output side pulley) of a continuously variable transmission to be used. The continuously variable transmission continuously changes the transmission gear ratio of a vehicle such as an automobile by controlling the diameter ratio of the two pulleys 4, 5. That is, the speed is reduced when the relation between the diameter of the driving pulley 4 (one curvature Ri of the continuously variable transmission belt 1) and the diameter of the driven pulley 5 (other curvature Ro of the continuously variable transmission belt 1) is set to "Ri<Ro", the speed is increased at "Ri>Ro", and the speed becomes constant at "Ri=Ro".

Incidentally, the continuously variable transmission belt 1 is an important transmission component for conveying the driving force of a vehicle, such as an automobile, to the drive train. Especially, when installed in a vehicle with a high powered engine, since a considerably large force is applied to the continuously variable transmission belt 1, sufficient consideration must be given to the durability of the continuously variable transmission belt 1.

Thus, Japanese laid-open (Kokai) patent application number (A) 2001-21007 titled "BELT FOR CONTINUOUSLY VARIABLE TRANSMISSION" indicates a technical problem that friction and the pressing force generated between the metal element 3a and the steel element 2a during transmission of the driving force shortens the fatigue life of the steel belt 2a, adversely affecting the durability of the continuously variable transmission belt 1, and discloses that in order to solve the problem, it is effective to devise a shape of the prescribed component of the metal element 3a (see saddle part 3g of FIG. 2A) which contacts with the steel belt 2a.

However, the technology disclosed in the aforementioned publication is applied only when the metal element 3a is being fabricated. Thus, even if an ideal machining shape can be designed, it is only a paper plan. In an actually manufactured component (metal element 3a), abnormal shaped portions ("flashes", "burrs", "chips", "swells", etc.) undeniably occur due to a punching error or the like. Even if precision punching work such as fine blanking process is carried out, since it is difficult to completely eliminate the abnormal shaped portions, for example, some remnants adhere to the punching "die", and these remnants may form very small abnormally shaped portions on the peripheral part of the machined component (metal element 3a).

Although such abnormal shaped portions can be reduced to a negligible level, for example by barrel processing, this requires so many man-hours to the point it causes a new inconvenience.

SUMMARY OF THE INVENTION

Therefore, it is an object of the present invention to provide a correction method which can efficiently and assuredly eliminate abnormal shaped portions of the metal element, thereby producing a continuously variable transmission belt constituted of only good quality metal elements to the market, as well as the manufacturing process of a continuously variable transmission, and can sufficiently increase reliability of the continuously variable transmission belt.

In accordance with the present invention, there is provided an element correction method of a continuously variable transmission belt assembled through supporting an element laminated body constituted of a number of metal elements on a belt laminated body constituted of a plurality of steel belts. The method comprises: a pre-step of removing the belt laminated body from the continuously variable transmission belt, and attaching a dummy belt in place of the removed belt laminated body; a trial step with a load applied on the continuously variable transmission belt to which the dummy belt is attached; and a post-step of removing the dummy belt from the continuously variable transmission belt after completion of the trial step, and attaching the belt laminated body removed in the pre-step or an equivalent belt laminated body in place of the removed dummy belt.

According to the invention, first, the original belt laminated body is removed from the continuously variable transmission belt, and the dummy belt is attached in place of the same. Then, a load is applied on the variable transmission belt to which the dummy belt is attached for trial use. Subsequently, the dummy belt is removed, the original belt laminated body or an equivalent belt laminated body is attached, and the continuously variable transmission belt is reassembled.

Thus, if the metal element which includes an abnormal shaped portion (see element 3i in FIG. 2A) is mixed in the metal elements constituting the element laminated body, and if the abnormal shaped portion is not negligible because it adversely affects durability of the continuously variable transmission belt, in the trial use, the abnormal shaped portion is worn away by friction and the pressing force between the surface of the dummy belt and the abnormal shaped portion, or reduced to a level which does not adversely affect the durability of the continuously variable transmission belt.

Therefore, the continuously variable transmission belt can be corrected, and only a good quality continuously variable transmission belt can be mounted to the continuously variable transmission. As a result, occurrence of problems in the continuously variable transmission can be prevented to achieve sufficient reliability.

According to the preferred embodiment of the invention, in the pre-step, the element laminated body is supported on the dummy belt in such a way that one or a plurality of metal elements is removed from the element laminated body.

According to this embodiment, since the removal of one or a plurality of metal elements expands the lamination span in the element laminated body to make the body loose (loosened), inclined angles of the metal elements constituting the laminated body become larger and, in the trial use, corners of the metal elements are easily brought into contact with the surface of the dummy belt. Thus, it is possible to efficiently eliminate or degrade especially abnormal shaped portions such as "flashes", "burrs", "chips", and "swells" generated at the corners of the metal elements. Further, in this case, the loosening of the laminated body can improve mounting workability of the dummy belt and reduce damage to the metal elements during mounting.

The dummy belt attached in the pre-step is constituted by laminating a plurality of steel belts as in the case of the belt laminated body removed in the pre-step, and the number of laminations is set smaller than the number of laminations for the belt laminated body removed in the pre-step.

According to this embodiment, since the number of laminations for the dummy belt is reduced and the element laminated body is supported on the dummy belt in the loose state with clearance, inclined angles of the metal elements constituting the laminated body become larger and, in the trial use, corners of the metal elements are easily brought into contact with the surface of the dummy belt. Thus, it is possible to efficiently eliminate or degrade especially abnormal shaped portions such as "flashes", "burrs", "chips", and "swells" generated at the corners of the metal elements. Further, in this case, the loosening of the laminated body can improve mounting workability of the dummy belt, and reduce damage to the metal elements during mounting.

Any dummy belt can be used as long as it has a shape and strength similar to the original belt laminated body. In reality, a dummy belt (spare or the like) identical to the original belt laminated body is preferably used from the viewpoint of costs, but a special dummy may be prepared.

For example, a thickness of the dummy belt attached in the pre-step may be thinner than a thickness of the belt laminated body removed in the pre-step. As in the aforementioned case, the element laminated body is supported on the dummy belt in a loose state with a clearance.

Additionally, the dummy belt attached in the pre-step may be constituted by forming a film or a layer having abrasive capability, alternatively applying abrasives on at least the ring inner peripheral surface thereof. By an abrasive force thereof, it is possible to more efficiently eliminate or degrade the abnormal shaped portions.

In the trial step, when the load is applied on the continuously variable transmission belt to which the dummy belt is attached for trial use, the trial may be carried out with lubricating oil containing abrasives spraying onto the continuously variable transmission belt. As in the above case, abrasive capability thereof can eliminate or degrade the abnormal shaped portions more efficiently.

The post-step may include a step of dipping the continuously variable transmission belt from which a dummy belt is removed in transmission lubricating oil or a degreasing solution for washing. It is possible to wash off the remnants of the shaved off abnormal shaped portions.

In the trial step, the trial use may be carried out through supporting the continuously variable transmission belt having the dummy belt on a driving pulley and a driven pulley of a continuously variable transmission or on two pulleys similar to the two pulleys, and applying a driving force on one pulley and a load on the other pulley, and when the trial use is carried out, a diameter of either the pulley with the driving fore applied or the pulley with the load applied may be reduced. It is possible to increase friction and the pressing force between the dummy belt and the metal element and if abnormal shaped portions are left on the metal element, it is possible to efficiently eliminate or degrade the abnormal shaped portions.

The load in the trial step may be a load close to a real use environment of the continuously variable transmission belt or a load imitating the real use environment. It is possible to carry out trial use closer to the real environment. If abnormal shaped portions are left on the metal element, it is possible to efficiently eliminate or degrade the abnormal shaped portions.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

Figure 1:
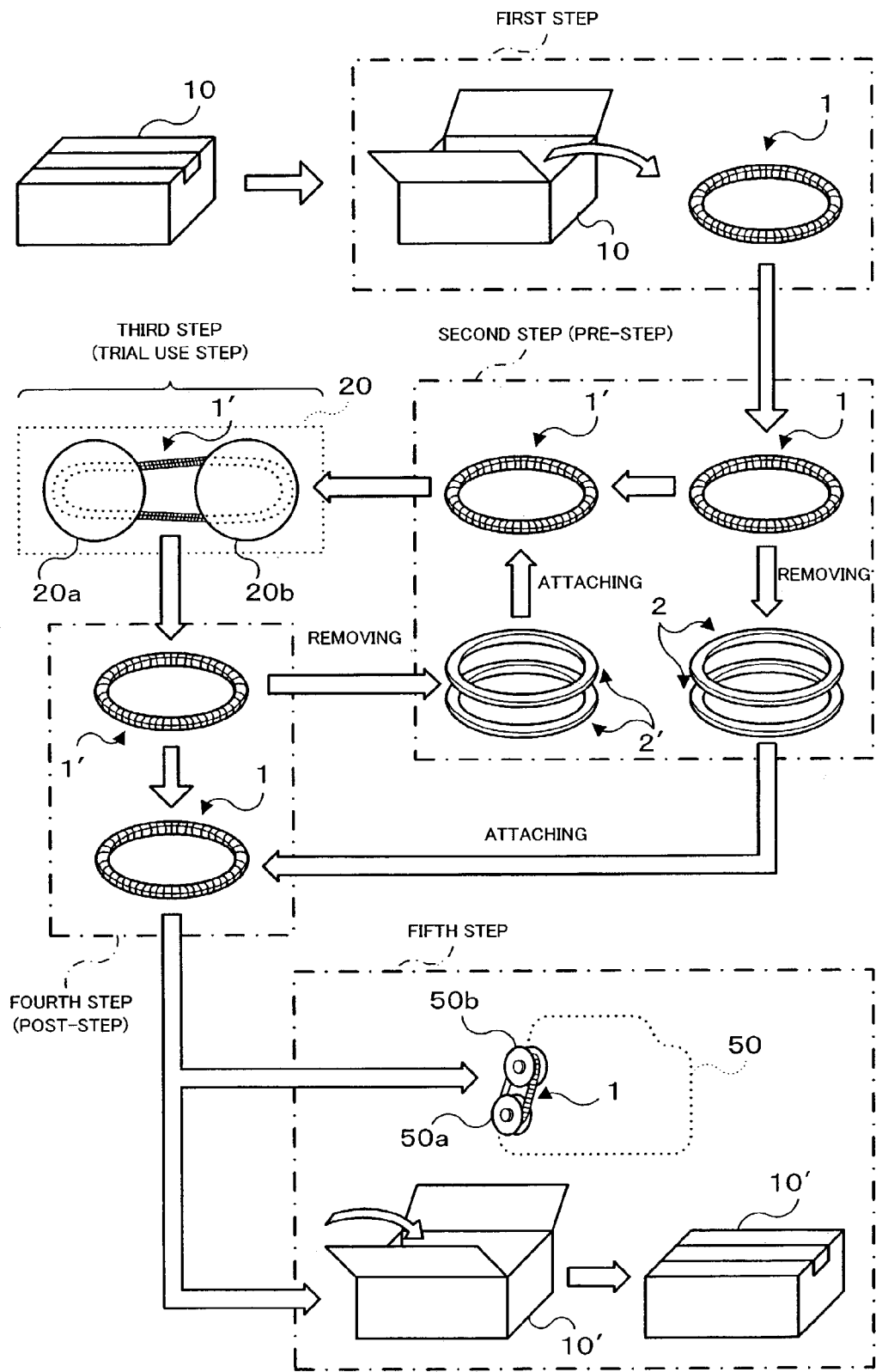
FIG. 1 is a conceptual process chart of an embodiment.
Figure 7A:
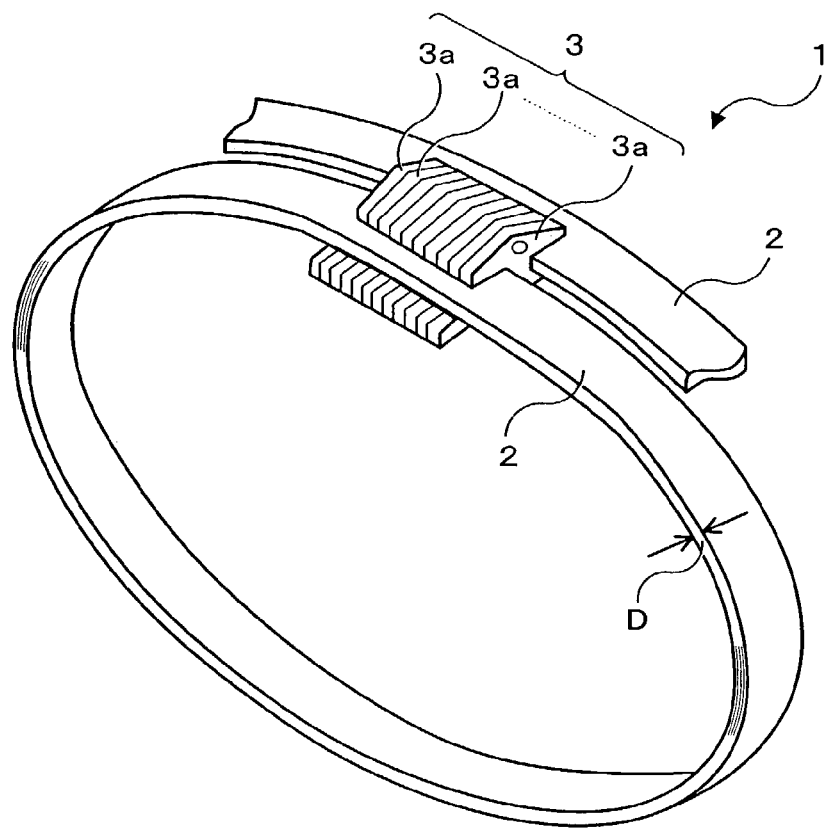
FIGS. 7A and 7B are appearance views of the continuously variable transmission belt 1.
Figure 7B:
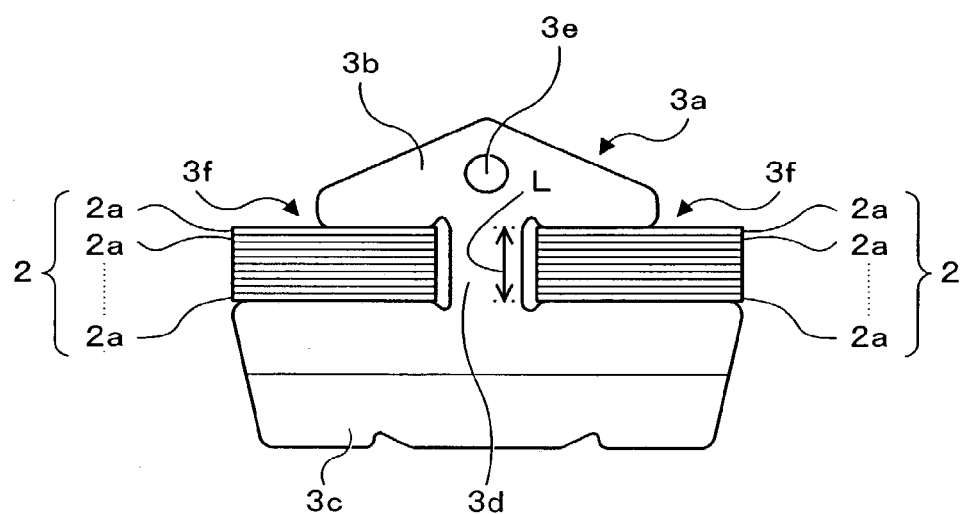
Figure 8:
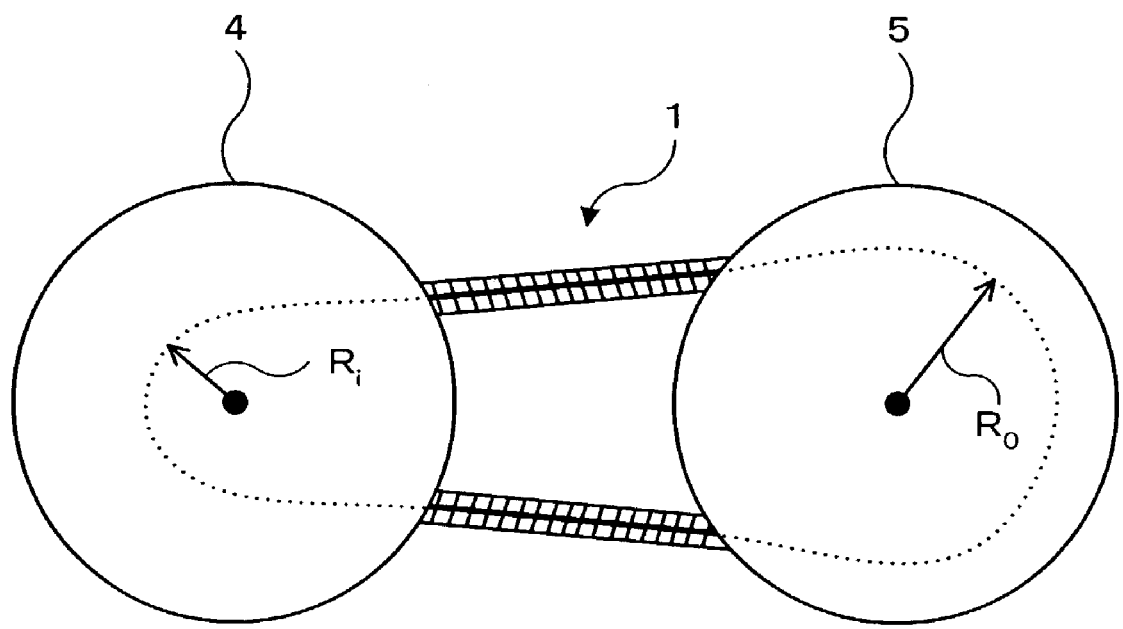
FIG. 8 is a use state view of the continuously variable transmission belt 1.

FIG. 1 is a conceptual process chart of an "element correction method of a continuously variable transmission belt" according to an embodiment. As described above with reference to FIGS. 7A and 7B, a continuously variable transmission belt 1 is assembled through supporting an element laminated body 3 constituted of a number of (e.g., about 400) metal elements 3a on two belt laminated bodies 2 each of which is constituted of a plurality (e.g., about 12) of steel belts 2a, and fed to the process in the assembled state.

Figure 2A:
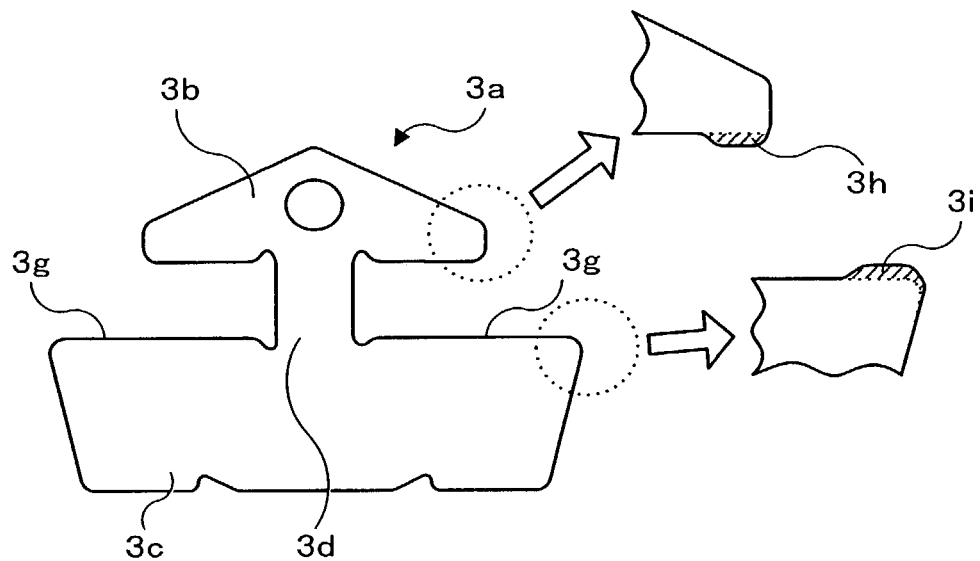
FIGS. 2A and 2B are an appearance view of a metal element 3a, an enlarged view of an example of its abnormal shaped portion, and a partially enlarged view of a continuously variable transmission belt 1.

FIG. 2A is a view showing an example of an abnormal shaped portion of the metal element 3a. In the drawing, a hatching portion 3h of a head part 3b of the metal element 3a and a hatching portion 3i of a saddle part 3g show representatively abnormal shaped portions. If these hatching portions (hereinafter referred to as "abnormal shaped portions") 3h, 3i are very small "swells", it is the abnormal shaped portion 3i positioned in the saddle part 3g that is likely to adversely affect durability of the metal element 3a.

Figure 2B:
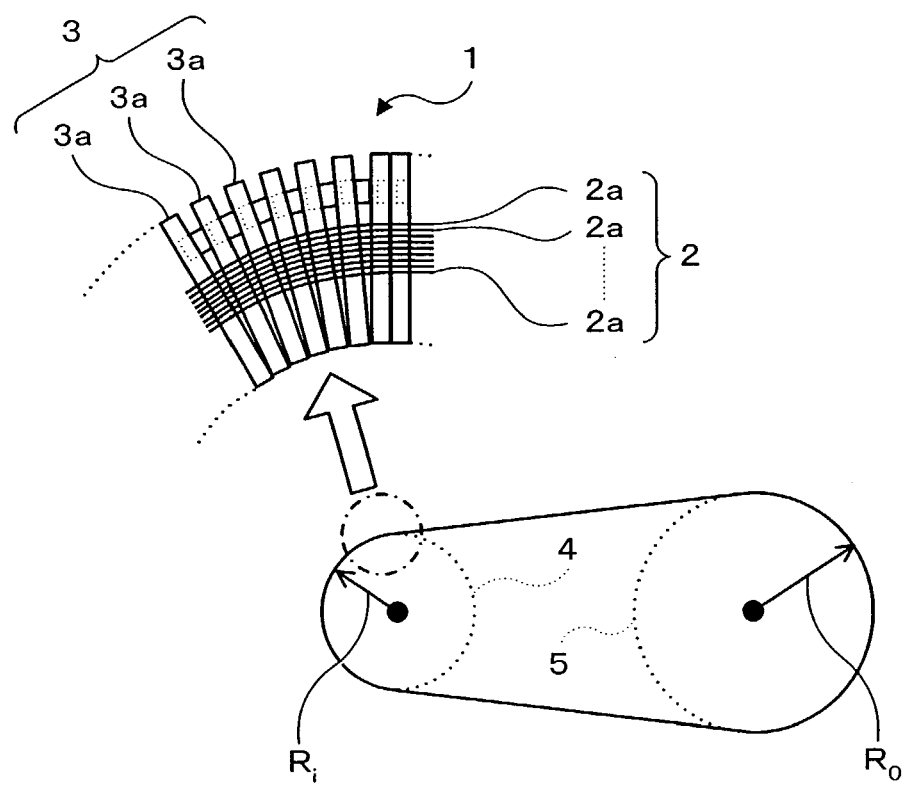

A reason is that as shown in FIG. 2B, when the continuously variable transmission belt 1 is laid on a driving pulley 4 and a driven pulley 5 and the driven pulley 5 is driven by the driving pulley 4, tensility of the belt laminated body 2 toward the ring inner side becomes larger as the diameter of the driving pulley 4 (curvature Ri of the continuously variable transmission belt 1) becomes smaller, and thus the belt laminated body 2 is pressed to the saddle part 3g by a stronger force. In the following steps, among the abnormal shaped portions formed in the metal element 3a, especially the abnormal shaped portion 3i positioned in the saddle part 3g which may potentially affect adversely the durability of the metal element 3a, are eliminated or reduced to a level which does not adversely affect the durability of the continuously variable transmission belt 1.

(First Step)

A box 10 of FIG. 1 indicates a package of the continuously variable transmission belt 1. In the "element correction method of the continuously variable transmission belt" of the embodiment, first, the continuously variable transmission belt 1 is taken out from the box 10. However, this is just an example and, needless to say, other reception methods may be used.

(Second Step: Equivalent to Pre-Step)

Then, after execution of required appearance inspection (inspection of appearance abnormality or the like), the two belt laminated bodies 2 are removed from the continuously variable transmission belt 1, and two dummy belts 2' are attached instead. Here, reasons for the use of the dummy belt 2' in place of the original belt laminated body 2 are as follows.

That is, the "element correction method of the continuously variable transmission belt" of the embodiment is devised through considering the following points:

(1) Even if a metal element 3a is manufactured by precision punching work such as fine blanking process, it is impossible to prevent completely the occurrence of abnormal shaped portions ("flashes", "burrs", "chips", "swells", etc.) of the metal element 3a with as-is status thereof;

(2) Since several hundreds of metal elements 3a are incorporated in one continuously variable transmission belt, it is unrealistic to inspect the metal elements 3a one by one from the viewpoint of costs; based on the aforementioned points, (3) The continuously variable transmission belt 1 in an assembled state is set on a trial device (described later) imitating a real continuously variable transmission and a trial running (trial use) are subjected to be carried out;

(4) If a metal element 3a having an abnormal shaped portion is included in the continuously variable transmission belt 1, the abnormal shaped portion is worn by friction and a pressing force between the metal element 3a and the belt laminated body 2. Consequently, the abnormal shaped portion is eliminated or reduced to a level which does not adversely affect the durability of the continuously variable transmission 1;

(5) However, if the trial use is carried out while the original belt laminated body 2 is mounted, the original belt laminated body 2 is damaged or scarred (see element 38 in FIG. 3B) during wearing of the abnormal shaped portion, consequently affecting the durability of the continuously variable transmission belt 1 adversely; thus (6) In the trial use, the dummy belt 2' is used in place of the original belt laminated body 2.

Therefore, the dummy belt 2' only needs to have a shape and strength similar to those of the original belt laminated body 2. In reality, preferably, a belt (spare) identical to the original belt laminated body is used from the viewpoint of costs. However, a special dummy may be used. An example of the special dummy will be described later.

(Third Step: Equivalent to Trial Step)

In this step, the continuously variable transmission belt 1' to which the dummy belt 2' is attached in place of the original belt laminated body 2 is laid on a driving pulley 20a and a driven pulley 20b of a trial device 20, and trial use is carried out under required conditions.

Figure 3A:
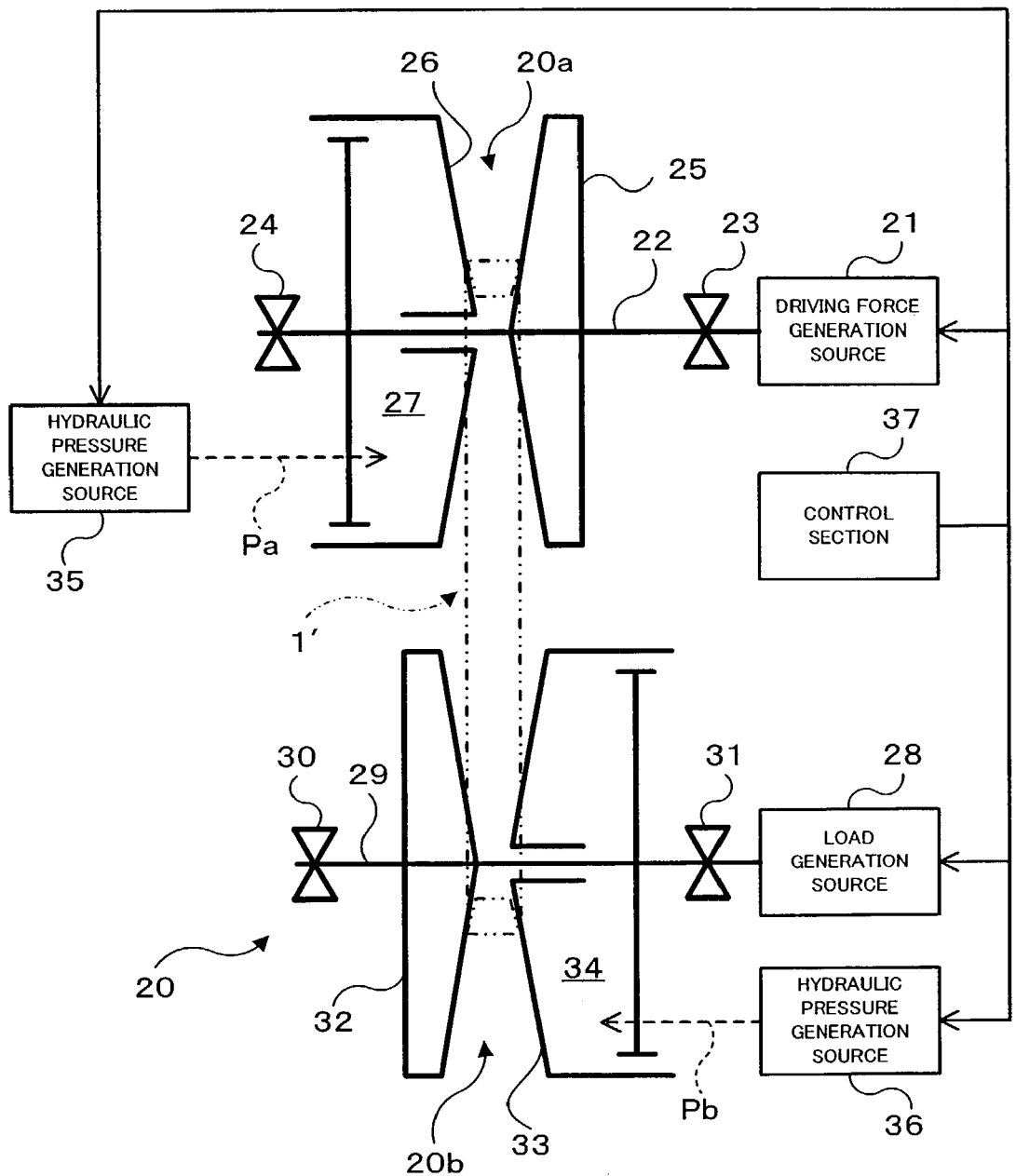
FIGS. 3A and 3B are views schematically showing the structure of a trial device 20.
Figure 3B:
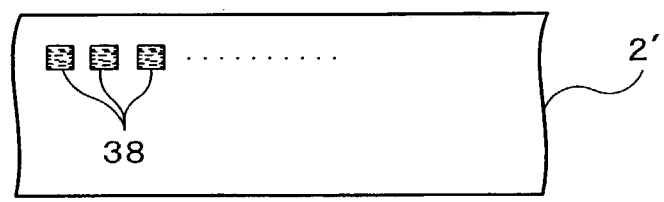

FIG. 3A shows a schematic structure of the trial device 20. In the drawing, the driving pulley 20a comprises a drive shaft 22 connected to a rotary shaft of a driving force generation source 21 (electric motor in the drawing), bearings 23, 24 for rotatably holding both ends of the drive shaft 22, a fixed side pulley half 25 secured to the drive shaft 22, and a movable side pulley half 26 arranged on the drive shaft 22 so as to be connectable to the fixed side pulley half 25. The movable side pulley half 26 is pressed toward the fixed side pulley half 25 by a hydraulic pressure Pa applied in an oil chamber 27. The movable side pulley half 26 is also called a movable sheave.

The driven pulley 20b comprises a driven shaft 29 arranged in parallel with the drive shaft 22 at a predetermined space, and connected to a rotary shaft of a load generation source 28 (regenerative braking equipment using an electric motor in the drawing), bearings 30, 31 for rotatably holding both ends of the driven shaft 29, a fixed side pulley half 32 secured to the driven shaft 29, and a movable side pulley half 33 arranged on the driven shaft 29 so as to be connectable to the fixed side pulley half 32. The movable side pulley half 33 is pressed toward the fixed side pulley half 32 by a hydraulic pressure Pb applied in an oil chamber 34. The movable side pulley half 33 is also called a movable sheave.

Furthermore, the trial device 20 comprises hydraulic pressure generation sources 35, 36 for generating the hydraulic pressures Pa, Pb, and a control section 37 for controlling operations of the driving force generation source 21, the load generation source 28, and the hydraulic pressure generation sources 35, 36.

According to the trial device 20 having such a constitution, the hydraulic pressures Pa, Pb are controlled while the continuously variable transmission belt 1' is laid on the driving pulley 20a and the driven pulley 20b, whereby both or one of the movable side pulley halves 26, 33 of the driving pulley 20*a* and the driven pulley 20*b* is pressed toward the fixed side pulley halves 25, 32. Thus, diameters of the driving pulley 20*a* and the driven pulley 20*b* (curvatures Ri, Ro of the continuously variable transmission belt 1') can be freely set to a desired relation (Ri<Ro, Ri>Ro, or Ri=Ro).

Then, the trial device 20 sets a load force of the load generation source 28 to a desired value after the setting of the curvatures Ri, Ro of the continuously variable transmission belt 1' to the desired relation, sets a driving force of the driving force generation source 21 to a desired value, and starts trial use of the continuously variable transmission belt 1'. Here, the curvatures Ri, Ro in the trial use is preferably set to a relation where one of Ri and Ro is smaller (i.e., Ri<Ro, or Ri>Ro). It is because when the continuously variable transmission belt 1 is actually used in the continuously variable transmission, a high load state occurs during acceleration or deceleration. In this respect (high load state during actual use), more preferably, a specific target of the aforementioned relation (Ri<Ro, or Ri>Ro) is set to a relation used at the time of starting or backing during the actual use. It is because the largest load is generated at the time of starting or backing.

A load force of the load generation source 28 is properly set by considering a traveling load during normal traveling, a traveling load at the time of starting or backing, etc. A driving force of the driving force generation source 21 is properly set by considering the engine output during the actual use. Trial use duration time of the continuously variable transmission belt 1' may be preset predetermined time or may be set by trial and error based on a test result.

As described above, the trial device 20 of the embodiment enables trial use of the continuously variable transmission belt 1' with a load applied, preferably enables trial use by applying a load imitating the real use environment of the continuously variable transmission belt 1'.

As the load imitating the real use environment, for example, a variable load may be used which is based on an irregular traveling mode such as 10-mode fuel consumption test. It is possible to carry out trial use closer to the real use environment.

(Fourth Step: Equivalent to Post-Step)

After the execution of the trial use, the dummy belt 2'is removed from the continuously variable transmission belt 1'. The belt laminated belt 2 is attached instead for reassembling (returned to the constitution of the original continuously variable transmission 1). This removal may be carried out mechanically by a special fixture or manually. Additionally, the belt laminated body 2 attached in this step may be a belt laminated body 2 originally attached to the continuously variable transmission belt 1 (i.e., the belt laminated body removed in the second step), or another belt laminated body 2 such as a spare.

(Fifth Step)

The continuously variable transmission belt 1 reassembled through the aforementioned steps is laid on a driving pulley 50*a* and a driven pulley 50*b* of a continuously variable transmission 50 as desired to complete all the steps of the embodiment. A main purpose of this step (fifth step) is to provide a good quality continuously variable transmission belt 1 having no potential risk of durability deterioration during the actual use to a manufacturing process of a continuously variable transmission, regardless the process location and whether the manufacturing process is in own company or in other company. Thus, this last step includes such modes as supplying the continuously variable transmission belt 1 to the market in the reassembled state as it is after the fourth step above mentioned, or wrapped, or alternatively packaged in a box 10' for example.

As apparent from the foregoing, according to the embodiment, the following advantages can be obtained.

If an assembled product (continuously variable transmission belt 1) which includes a metal element 3*a* having an abnormal shaped portion 3*i* as shown in FIG. 2A is received, the abnormal shaped portion 3*i* can be worn away through the trial step (third step), or reduced to a level which does not adversely affect the durability of the continuously variable transmission belt 1. Thus, only a good quality continuously variable transmission belt 1 can be mounted to the continuously variable transmission 50, or only the good quality continuously variable transmission belt 1 can be shipped. As a result, occurrence of problems in the continuously variable transmission 50 can be prevented to achieve sufficient reliability.

The present invention is not limited to the foregoing embodiment. Needless to say, various modifications can be made within the scope of the intention of the present invention.

Figure 4A:
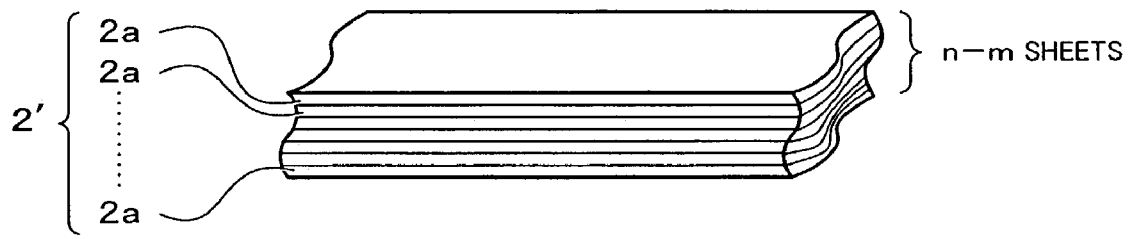
FIGS. 4A to 4D are views showing other examples of a dummy belt 2'.

For example, as shown in FIG. 4A, if the dummy belt 2' is constituted of a plurality of steel belts 2*a* as in the case of the original belt laminated body 2, the number of laminations may be smaller than that of the original belt laminated body 2. In the drawing, "n" denotes the number of laminations for the original belt laminated body 2, "m" denotes a reduced number, and the number for the dummy belt 2' is "n−m".

Figure 4B:
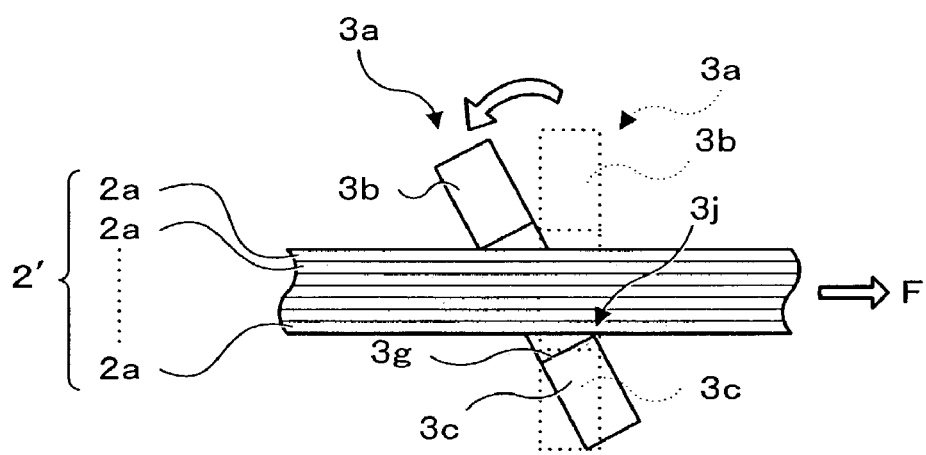

Thus, as shown in FIG. 4B, since a space between the head part 3*b* and the breast part 3*c* of the metal element 3*a* and the dummy belt 2' is enlarged, the metal element 3*a* is supported on the dummy belt 2' in a loose state. Accordingly, when the dummy belt 2' is pulled by a driving force F in trial use, the metal element 3*a* inclines to bring its corners (especially, corner 3*j* of the saddle part 3*g*) into contact with the surface of the dummy belt 2', whereby an abnormal shaped portion formed at the corner can be efficiently worn away or reduced. Further, the loose state improves mounting workability of the dummy belt 2', and damage to the metal element 3*a* during the mounting can be reduced.

Figure 4C:
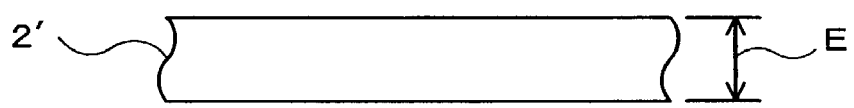

As shown in FIG. 4C, the dummy belt 2' may be special. That is, without using the belt similar to the original belt laminated body, one metal endless belt having a predetermined thickness E may be used as the dummy belt 2'. In this case, preferably, the thickness E of the dummy belt 2' is equivalent to a thickness of the dummy belt 2' of FIG. 4A (thickness corresponding to the number of laminations "n−m").

Figure 4D:
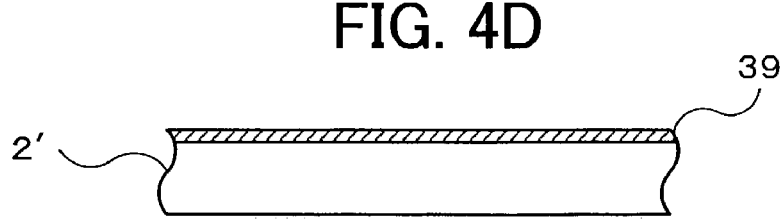

If the special dummy belt 2' is used, as shown in FIG. 4D, a film 39 having abrasive capability may be formed (or layer may be formed, alternatively abrasives may be applied) on the surface (ring inner peripheral surface; i.e., surface in contact with the saddle part 3*g* of the metal element 3*a*) thereof. An abrasive force of the film 39 can efficiently eliminate or degrade the abnormal shaped portion. If the dummy belt 2' is constituted by laminating a plurality of steel belts 2*a* as in the case of the original belt laminated body 2, a film 39 similar to the above may be formed (or layer may be formed, alternatively abrasives may be applied) on the surface of one steel belt 2*a* positioned in an outermost layer.

Figure 5:
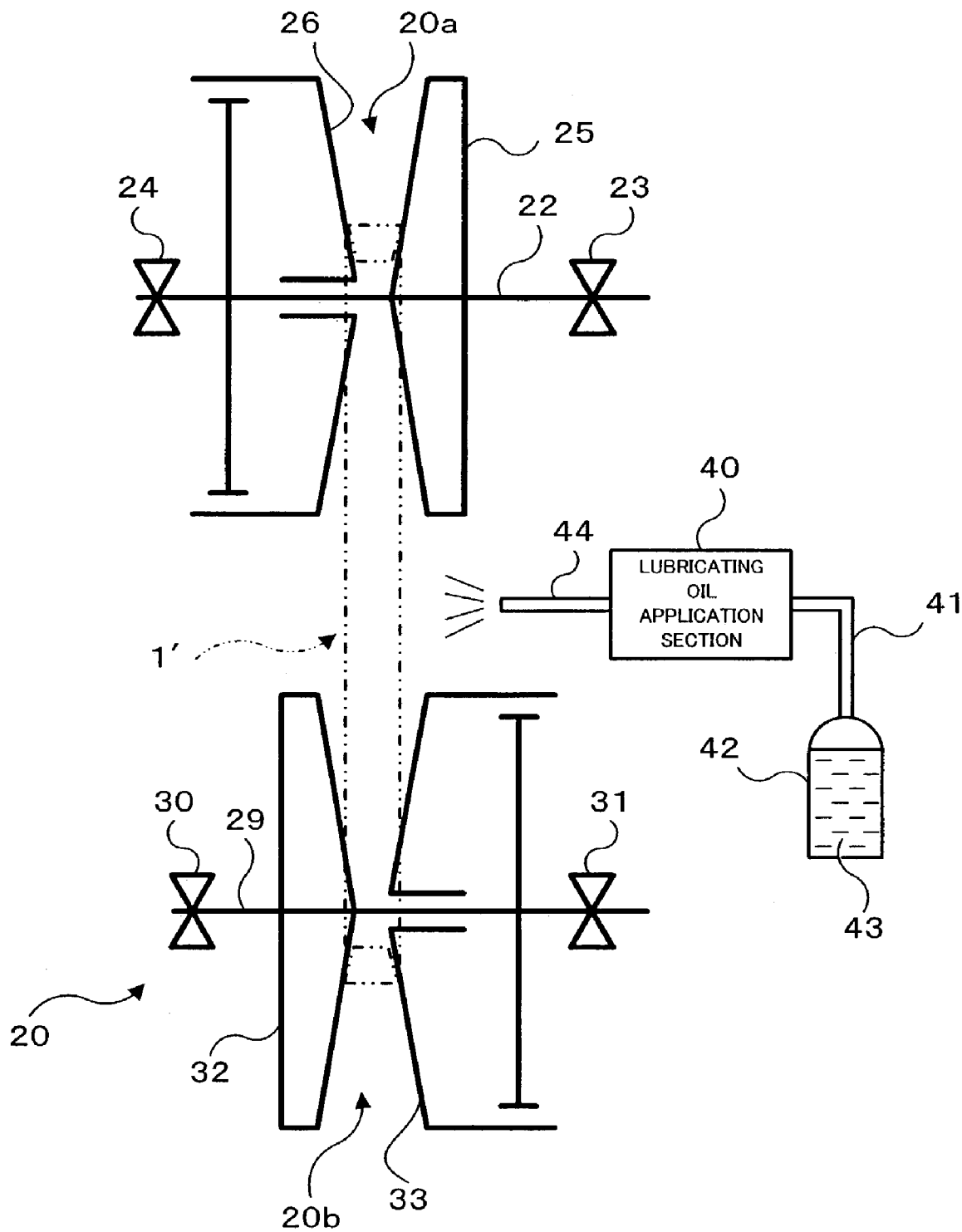
FIG. 5 is a view showing another example of the trial device 20.

As shown in FIG. 5, the trial device 20 may further include a lubricating oil application section 40, a tank 42 connected through a pipe 41 to the lubricating oil application section 40, lubricating oil (containing abrasive material;

referred to as "lubricating oil containing abrasive material" herein after) 43 which is filled in the tank 42, and in addition an outlet 44 disposed in a position facing the continuously variable transmission belt 1' laid on the driving pulley 20a and the driven pulley 20b. The lubricating oil containing abrasive material 43 scooped up from the tank 42 may be sprayed from the outlet 44 to the continuously variable transmission belt 1' in trial use. Lubrication of the continuously variable transmission belt 1' and wear promotion of the abnormal shaped portion can be simultaneously carried out.

Figure 6:
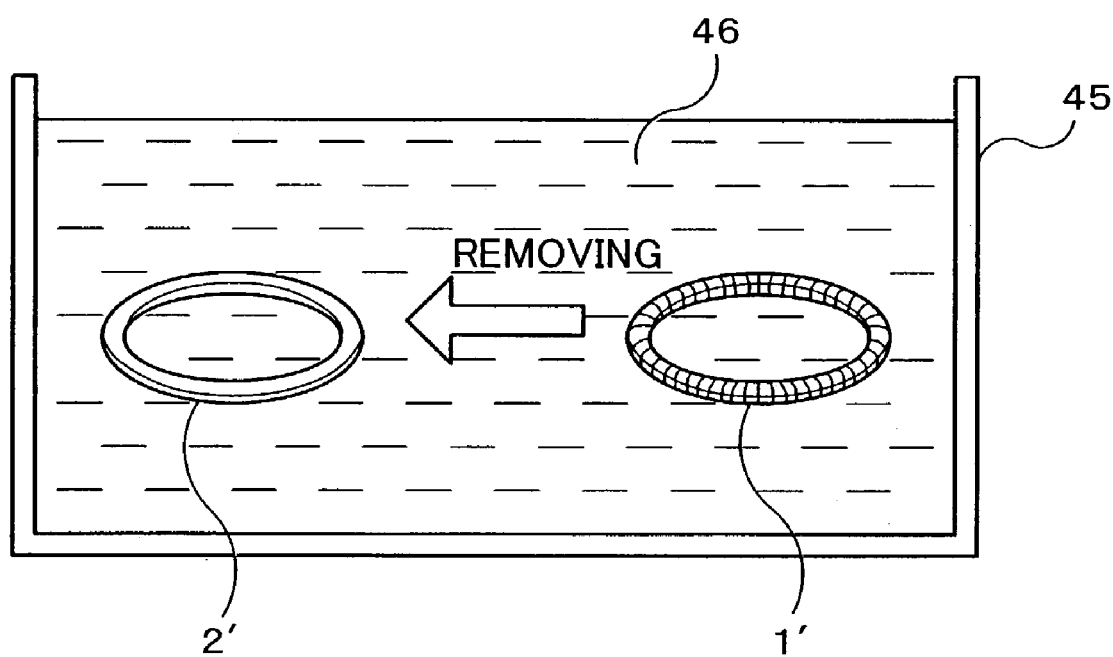
FIG. 6 is a view showing work added to the fourth step.

Work shown in FIG. 6 may be added to the fourth step (second removing step). In FIG. 6, there is transmission lubricating oil or degrease solution 46 (e.g., hydrocarbon solvent) in a container 45. Removing the dummy ring 2' from the continuously variable transmission belt 1' in the solution 46 washes off remnants (metal powder or the like of the abnormal shaped portion shaved off in the trial step) adhering to each portion of the continuously variable transmission belt 1' and the dummy ring 2'. If the "transmission lubricating oil" is used as the solution 46, genuine brand of lubricating oil for the continuously variable transmission to which the continuously variable transmission belt 1 is mounted, recommended lubricating oil, or equivalent lubricating oil is preferably used. It is because even if the solution 46 is left on the continuously variable transmission belt 1, it can be directly mounted to the continuously variable transmission.

According to the present invention, first, the original belt laminated body is removed from the continuously variable transmission belt, and the dummy belt is attached in place of the same. Then, the load is applied on the variable transmission belt to which the dummy belt is attached for trial use. Subsequently, the dummy belt is removed, the original belt laminated body or an equivalent belt laminated body is attached, and the continuously variable transmission belt is reassembled.

Thus, if a metal element which includes an abnormal shaped portion (see element 3i in FIG. 2A) is mixed in the metal elements constituting the element laminated body, and if the abnormal shaped portion is not negligible because it adversely affects the durability of the continuously variable transmission belt, in the trial use, the abnormal shaped portion is worn away by friction and a pressing force between the surface of the dummy belt and the abnormal shaped portion, or reduced to a level which does not adversely affect the durability of the continuously variable transmission belt.

Therefore, the continuously variable transmission belt can be corrected, and only a good quality continuously variable transmission belt can be mounted to the continuously variable transmission. As a result, occurrence of problems in the continuously variable transmission can be prevented to achieve sufficient reliability.

According to the preferred embodiment of the present invention, since the removal of one or a plurality of metal elements expands the lamination span of the element laminated body to make the body loose, the inclined angles of the metal elements constituting the laminated body become larger and, in the trial use, the corners of the metal elements are easily brought into contact with the surface of the dummy belt. Thus, it is possible to efficiently eliminate or degrade especially abnormal shaped portions such as "flashes", "burrs", "chips", and "swells" generated at the corners of the metal elements. Further, in this case, the loosening of the laminated body can improve mounting workability of the dummy belt, and reduce damage to the metal elements during mounting.

If the number of laminations for the dummy belt is reduced, or the thickness of the dummy belt is set smaller than that of the belt laminated body, the element laminated body can be supported on the dummy belt in the loose state with clearance, thus the inclined angles of the metal elements constituting the laminated body become larger and, in the trial use, the corners of the metal elements are easily brought into contact with the surface of the dummy belt. Thus, it is possible to efficiently eliminate or degrade especially abnormal shaped portions such as "flashes", "burrs", "chips", and "swells" generated at the corners of the metal elements. Further, in this case, the loosening of the laminated body can improve mounting workability of the dummy belt, and reduce damage to the metal elements during mounting.

A film or a layer having abrasive capability is formed, alternatively abrasives are applied on at least the ring inner peripheral surface thereof. By an abrasive force thereof, it is possible to more efficiently eliminate or degrade the abnormal shaped portions.

The trial use is carried out by spraying lubricating oil containing abrasives to the continuously variable transmission belt. Thus, by an abrasive force thereof, it is possible to more efficiently eliminate or degrade the abnormal shaped portions.

The continuously variable transmission belt which is in the state of the dummy belt removed is dipped in transmission lubricating oil or a degrease solution to carry out washing. Thus, it is possible to wash off the remnants of the shaved off abnormal shaped portions.

When the trial use is carried out, the diameter of either the pulley with the driving force applied or the pulley with the load applied is reduced. Thus, it is possible to increase friction and the pressing force between the dummy belt and the metal element. If abnormal shaped portions are left on the metal element, it is possible to efficiently eliminate or degrade the abnormal shaped portions.

The load in the trial step is a load close to the real use environment of the continuously variable transmission belt or a load imitating the real use environment. Thus, it is possible to carry out trial use closer to the real environment. If abnormal shaped portions are left on the metal element, it is possible to efficiently eliminate or degrade the abnormal shaped portions.

While the present invention has been described with reference to the preferred embodiments thereof, the invention is not to be limited to the details given therein.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An element correction method of a Continuously Variable Transmission (CVT) belt assembled with a belt laminated body comprising plural sheets of steel belts which support an element layered body constituted from a number of metal elements; said element correction method of a CVT belt comprises the processing steps of:
    a pre-step for removing said belt laminated body of said CVT belt and attaching a dummy belt in place of said removed belt laminated body;
    a trial step for applying a trial use load to said attached dummy belt of said CVT belt to eliminate abnormal shaped portions generated during production at the edges of metal elements; and a post-step for removing said dummy belt of said CVT belt after completion of said trial step and attaching said belt laminated body removed in said pre-step or a belt laminated body of similar structure in place of said removed dummy belt.

2. The element correction method of a CVT belt according to claim 1, wherein said pre-step said dummy belt supports the element layered body at the stage when one or more than one metal element is removed from the element layered body.

3. The element correction method of a CVT belt according to claim 1, wherein said dummy belt attached in said pre-step is constituted from plural sheets of steel belts laminated in a similar manner to the belt laminated body removed in said pre-step and further the number of stacked layers is less than the number of stacked layers of the belt laminated body removed in said pre-step.

4. The element correction method of a CVT belt according to claim 1, wherein said dummy belt attached in said pre-step is thinner than the thickness of the belt laminated body removed in said pre-step.

5. The element correction method of a CVT belt according to claim 1, wherein said dummy belt attached in said pre-step contains a film or layer having an abrasive property or a coating with an abrasive compound, at least, on that ring inner circumference surface.

6. The element correction method of a CVT belt according to claim 1, wherein said trial step during application of a trial use load to said attached dummy belt of said CVT belt, trial use is carried out in conjunction with spraying a lubricant containing an abrasive compound on said CVT belt.

7. The element correction method of a CVT belt according to claim 1, wherein said post-step includes a process for washing said CVT belt at the stage where a dummy belt is removed and immersed in a transmission lubricant or a degrease solution.

8. The element correction method of a CVT belt according to claim 1, wherein said trial step of said CVT belt which includes said dummy belt is wrapped around a driving pulley and a driven pulley or two pulleys comparable to these two pulleys respectively and trial use is performed by applying a driving force to one side pulley and applying a load to an opposite side pulley and, when effecting that trial use, the diameter of a pulley by the side applying driving force or a pulley of the load side is decreased.

9. The element correction method of a CVT belt according to claim 1, wherein said load in said trial step is a load which simulates a load close to an actual use environment or an actual use environment of a CVT belt.

* * * * *